United States Patent [19]

Kishida et al.

[11] Patent Number: 5,008,313

[45] Date of Patent: Apr. 16, 1991

[54] IMPACT MODIFIER FOR THERMOPLASTIC RESIN HAVING GOOD HEAT DISCOLORATION RESISTANCE AND HEAT DETERIORATION RESISTANCE, AND THERMOPLASTIC RESIN COMPOSITION COMPRISING THIS IMPACT MODIFIER

[75] Inventors: Kazuo Kishida, Hiroshima; Kiyokazu Kitai, Tokyo; Masaaki Mohri, Hiroshima, all of Japan

[73] Assignee: Mitsubishi Rayon Company, Ltd., Tokyo, Japan

[21] Appl. No.: 329,256

[22] Filed: Mar. 27, 1989

[30] Foreign Application Priority Data

Mar. 28, 1988 [JP] Japan .................. 63-074171

[51] Int. Cl.$^5$ .................. C08K 5/13; C08K 5/524; C08K 5/41
[52] U.S. Cl. .................. 524/120; 524/153; 524/289; 524/290; 524/342
[58] Field of Search .................. 524/153, 120, 289, 290, 524/342

[56] References Cited

U.S. PATENT DOCUMENTS

| | | | |
|---|---|---|---|
| 2,847,443 | 8/1958 | Hechenbleikner et al. | 524/120 |
| 3,053,878 | 9/1962 | Friedman et al. | 524/120 |
| 3,595,936 | 7/1971 | Birenzvige et al. | 524/100 |
| 3,637,582 | 1/1972 | Gilles | 524/101 |
| 4,025,486 | 5/1977 | Gilles | 524/101 |
| 4,064,100 | 12/1977 | Hechenbleikner | 524/120 |
| 4,105,629 | 8/1978 | Minagawa et al. | 524/101 |
| 4,206,111 | 6/1980 | Valdiserri et al. | 524/120 |
| 4,305,866 | 12/1981 | York et al. | 524/120 |
| 4,371,647 | 2/1983 | Minagawa et al. | 524/120 |
| 4,377,651 | 3/1983 | Leininger | 524/120 |
| 4,472,548 | 9/1984 | Son et al. | 524/102 |
| 4,474,914 | 10/1984 | Spivack | 524/101 |
| 4,507,414 | 3/1985 | McRowe et al. | 524/100 |
| 4,507,417 | 3/1985 | Ishii et al. | 524/101 |
| 4,670,493 | 6/1987 | Van Asbroeck et al. | 524/120 |
| 4,829,110 | 5/1989 | Van Asbroeck et al. | 524/120 |

FOREIGN PATENT DOCUMENTS 0114288 12/1983 European Pat. Off. .
0153867 2/1985 European Pat. Off. .

*Primary Examiner*—Kriellion Morgan
*Attorney, Agent, or Firm*—Oblon, Spivak, McClelland, Maier & Neustadt

[57] ABSTRACT

An impact modifier for a thermoplastic resin is disclosed, which comprises (I) 100 parts by weight of a graft copolymer formed by graft-polymerizing (B) a monomer having a vinyl group in the molecule onto (A) a butadiene polymer and, incorporated therein, (II) 0.01 to 5 parts by weight of a thioether type heat stabilizer, (III) 0.01 to 5 parts by weight of a phosphite type heat stabilizer and (IV) 0.01 to 5 parts by weight of a phenol type heat stabilizer having a molecular eight of at least 500. A thermoplastic resin composition having this impact modifier incorporated therein exhibits a good heat discoloration resistance and heat deterioration resistance under high-temperature conditions, as well as an improved impact resistance.

13 Claims, No Drawings

IMPACT MODIFIER FOR THERMOPLASTIC RESIN HAVING GOOD HEAT DISCOLORATION RESISTANCE AND HEAT DETERIORATION RESISTANCE, AND THERMOPLASTIC RESIN COMPOSITION COMPRISING THIS IMPACT MODIFIER

BACKGROUND OF THE INVENTION

1. Field of the Invention

The present invention relates to an impact modifier for a thermoplastic resin having an excellent heat discoloration resistance and heat deterioration resistance under high-temperature conditions, and a thermoplastic resin composition formed by incorporating this impact modifier into a thermoplastic resin.

2. Description of the Related Art

Currently a polyester resin such as polyethylene terephthalate or polytetramethylene terephthalate is used for parts and members subjected to high temperatures, such as oven-useable trays, engineering plastics for exterior parts of heating devices, and electric parts, by utilizing the high melting points of such a resin. These polyester resins moreover have a poor toughness, and accordingly, a method has been proposed in which a methyl methacrylate/butadiene/ styrene copolymer (MBS resin) comprising a butadiene polymer as the rubber component is incorporated into a polyester resin to improve the impact resistance of the polyester resin.

A polycarbonate resin has an excellent impact resistance, heat resistance, dimensional stability, and electric insulating property and is widely used for machine parts, safe tools, electrically insulating members, optical machine parts, and containers.

This polycarbonate resin however, has a poor flowability and chemical resistance, and accordingly, as a means of overcoming there defects, a polymer-alloying process has been proposed and developed in which a saturated polyester resin such as polyethylene terephthalate or polytetramethylene terephthalate is incorporated in the polycarbonate resin (see Japanese Examined Patent Publication No. 36-14035, Japanese Examined Patent Publication No. 53-12537 and Japanese Examined Patent Publication No. 57-2744), and thus the application range thereof has been broadened. Nevertheless, if a saturated polyester resin is incorporated in a polycarbonate resin, the toughness possessed by the polycarbonate resin is reduced and accordingly, a process has been proposed in which the impact strength is improved by further incorporating an MBS resin (see Japanese Examined Patent Publication No. 55-9435).

It is known that an MBS resin can be incorporated in a vinyl chloride resin, and it is known as well that an MBS resin can be incorporated into a thermoplastic resin such as a saturated polyester resin or a polycarbonate resin, to improve the impact resistance.

But where a thermoplastic resin, in which an impact modifier comprising a butadiene polymer as the rubber component is incorporated is subjected to extrusion molding or injection molding under high-temperature conditions, the physical properties are often reduced by a heat discoloration or heat deterioration attributed to the butadiene rubber component in the MBS resin. Furthermore, this impact modifier is disadvantageous in that, if the obtained molded article is heat-treated, the impact strength retention ratio is lowered, and thus various improvements have been proposed; for example, an incorporation of a phenol type heat stabilizer into a thermoplastic resin. More specifically, the incorporation of a phenol type heat stabilizer is disclosed in the specification of U.S. Pat. No. 3,637,582, the incorporation of a thioether type heat stabilizer is disclosed in U.S. Pat. No. 3,758,549 and the incorporation of a phosphite type heat stabilizer is disclosed in U.S. Pat. No. 4,057,163, U.S. Pat. No. 4,088,709 and U.S. Pat. No. 4,474,914. Furthermore, a combined incorporation of a phenol type heat stabilizer and a thioether type heat stabilizer is disclosed in U.S. Pat. No. 4,105,629, U.S. Pat. No.4,507,417, and U.S. Pat. No. 4,576,734 and the combined incorporation of a phenol type heat stabilizer and a phosphite type heat stabilizer is disclosed in U.S. Pat. No. 3,595,936, U.S. Pat. No. 4,025,486, U.S. Pat. No. 4,472,548, and U.S. Pat. No. 4,584,146.

In these proposals, however, where a thermoplastic resin, in which an impact modifier comprising a butadiene polymer as the rubber component is incorporated is subjected to extrusion molding or injection molding under high-temperature conditions, a reduction of the physical properties by a heat discoloration or heat deterioration attributed to the butadiene polymer rubber component in the MBS resin, and a reduction of the impact strength retention ratio upon heat treatment of the obtained molded article, cannot be properly controlled.

SUMMARY OF THE INVENTION

Under the above-mentioned background, the primary object of the present invention is to provide an improved impact modifier for a thermoplastic resin, which modifier comprises a butadiene polymer as a rubber component, the thermoplastic composition obtained by incorporation of this impact modifier results in a shaped article exhibiting an improved impact strength without a significant reduction of the physical properties due to a heat discoloration or heat deterioration attributed to the butadiene rubber component.

In accordance with the present invention, there is provided an impact modifier for a thermoplastic resin having a good heat discoloration resistance and heat deterioration resistance, which comprises (I) 100 parts by weight of a graft copolymer formed by graft-polymerizing (B) a monomer having a vinyl group in the molecule onto (A) a butadiene polymer and, incorporated therein, (II) 0.01 to 5 parts by weight of a thioether type heat stabilizer, (III) 0.01 to 5 parts by weight of a phosphite type heat stabilizer and (IV) 0.01 to 5 parts by weight of a phenol type heat stabilizer having a molecular weight of at least 500.

Furthermore, according to the present invention, there is provided a thermoplastic resin composition having a good impact resistance and heat stability, which comprises 100 parts by weight of a thermoplastic resin and 2 to 50 parts by weight of the above-mentioned impact modifier for a thermoplastic resin.

DESCRIPTION OF THE PREFERRED EMBODIMENTS

The graft copolymer (I) used in the present invention is formed by graft-polymerizing (B) a monomer having a vinyl group in the molecule to (A) a butadiene polymer. As the butadiene polymer (A), there can be mentioned polybutadiene, and a butadiene copolymer, such as a butadiene/styrene copolymer or butadiene/alkyl acrylate copolymer, which has a butadiene unit content of at least 40% by weight, preferably at least 50% by weight. The alkyl acrylate is one having 1 to 8 carbon atoms in the alkyl group, and as specific examples, there can be mentioned methyl acrylate, ethyl acrylate, butyl acrylate and 2-ethylhexyl acrylate. The monomer (B) having a vinyl group in the molecule is at least one monomer selected from the group consisting of alkyl methacrylates, alkyl acrylates, aromatic vinyl compounds and vinyl cyanide compounds. The alkyl methacrylate is one having 1 to 4 carbon atoms in the alkyl group, and there can be mentioned methyl methacrylate, ethyl methacrylate and butyl methacrylate. Alkyl acrylates having 1 to 8 carbon atoms in the alkyl group can be used as the alkyl acrylate, and there can be mentioned methyl acrylate, ethyl acrylate, butyl acrylate and 2-ethylhexyl acrylate. As the aromatic vinyl compound, there can be mentionedstyrene and a-methylstyrene, and as the vinyl cyanide compound, there can be mentioned acrylonitrile and methacrylonitrile. Of these monomers (B) having a vinyl group in the molecule, methyl methacrylate, ethyl acrylate, butyl acrylate, styrene and acrylonitrile are preferably used.

The thioether type heat stabilizer (II) used in the present invention effectively controls heat discoloration or heat deterioration under high-temperature conditions over a long term and retains the impact resistance at a high level where a thermoplastic resin, in which an impact modifier comprising a butadiene polymer as the rubber component is incorporated, is subjected to extrusion molding or injection molding under high-temperature conditions. The thioether heat stabilizer (II) has sulfide-S- as the main structure. As specific examples, there can be mentioned 3,3'-thiodipropionic acid, dialkyl 3,3'-thiodipropionates, pentaerythrityl-tetrakis(3-alkylthiopropionates), tetrakis[methylene-3-(alkylthio)-propionato]methanes and bis[2-methyl-4-(3-alkyl-thiopropionyloxy)-5-tertiarybutylphenyl]sulfides, and dialkyl 3,3'-thiodipropionates, and tetrakis[methylene-3-(alkylthio)propionato]methanes and bis[2-methyl-4-(3-alkyl-thiopropio-nyloxy)-5-tertiary-butylphenyl]sulfides are especially preferred.

The phosphite type heat stabilizer (III) used in the present invention effectively controls heat discoloration or heat deterioration under high-temperature conditions, for a short time, and retains the impact resistance at a high level where a thermoplastic resin, in which an impact modifier comprising a butadiene polymer as the rubber component is incorporated, is subjected to extrusion molding or injection molding under high-temperature conditions and the obtained molded article is heat treated. Phosphorous acid esters are mainly used as the phosphite type heat stabilizer (III), and furthermore, phosphites and phosphophenanthrene compounds can be used. As specific examples, there can be mentioned tris(nonylphenyl) phosphite, distearylpentaerythritol diphosphite, tris(2,4-di-tertiary-butylphenyl) phosphite, di(2,4-ditertiary-butylphenyl)pentaerythritol diphosphite, and bis(2,6-di-tertiary-butyl-4-methylphenyl)pentaerythritol diphosphite. Compounds having a pentaerythritol structure in the molecule are preferred, and di(2,4-di-tertiary-butylphenyl)pentaerythritol diphosphite and bis(2,6-di-tertiary-butyl-4-methylphenyl)pentaerythritol diphosphite are especially preferred.

In the present invention, the phenol type heat stabilizer (IV) effectively controls heat discoloration or heat deterioration under high-temperature conditions and retains the impact resistance at a high level when used in combination with the thioether type heat stabilizer (II) and the phosphite type heat stabilizer (III). The phenol heat stabilizer (IV) is a hindered phenol compound in which a bulky group is present at the ortho-position of the OH group of the phenol compound to hinder the properties of the phenolic OH group and which has a molecular weight of at least 500. As specific examples, there can be mentioned 1,1,3-tris(2-methyl-4-hydroxy-5-tertiary-butylphenyl)butane-n-octadecyl-3(3',5'-di-tertiary-butyl-4'-hydroxyphenyl)propionate, tetrakis[methylene-3-(3',5'-di-tertiary-butyl-4'-hydroxyphenyl)propionate]methane, triethylene glycol bis[3-(3-tertiary-butyl-5-methyl-4-hydroxyphenyl)propio-nate]and pentaerythrityl tetrakis[3-(3,5-di-tertiary-butyl-4-hydroxyphenyl)propionate], and n-octadecyl-3and triethylene glycol bis[3-(3-tertiary-butyl-5-methyl-4-hydroxyphenyl)propionate], and n-octadecyl-3-(3',5'-di-tertiary-butyl-4'-hydroxyphenyl)propionate and triethylene glycol bis[3-(3-tertiary-butyl-5-methyl-4-hydroxyphenyl)propionate] are especially preferred.

The molecular weight of the phenol type heat stabilizer used in the present invention is at least 500. If an impact modifier prepared by using a phenol type stabilizer having a molecular weight lower than 500 is incorporated into a thermoplastic resin, the heat stabilizer is sublimated or evaporated at the step of extrusion-molding the obtained resin composition at a high temperature exceeding 200° C., and the heat discoloration resistance or heat deterioration resistance is drastically reduced.

In the impact modifier for a thermoplastic resin according to the present invention, the above-mentioned thioether type heat stabilizer (II), the above-mentioned phosphite type heat stabilizer (III) and the abovementioned phenol type heat stabilizer (IV) having a molecular weight of at least 500 must be used in combination. If one of these three heat stabilizers (II), (III) and (IV) is used alone or only two of the foregoing three seat stabilizers (II), (III) and (IV) are used in combination, a desirable effect cannot be obtained. Each of the thioether type heat stabilizer (II), the phosphite type heat stabilizer (III) and the phenol type heat stabilizer (IV) having a molecular weight of at least 500 is incorporated in an amount of 0.01 to 5 parts by weight per 100 parts by weight of the graft copolymer (I). If the amount of any heat stabilizer is smaller than 0.01 part by weight, the intended effect is not attained and if the amount of any heat stabilizer exceeds 5 parts by weight, the effect is not proportionally enhanced.

In connection with the method of incorporating the foregoing three heat stabilizers, where the above-mentioned graft copolymer (I) is prepared by the emulsion polymerization, these three heat stabilizers can be emulsified and dispersed simultaneously or independently or can be added after termination of the polymerization or during the coagulation, dehydration or drying operation. Alternatively, the three heat stabilizers can be simultaneously or independently added to a dry powder of the graft copolymer (I) or when the graft copolymer (I) is mixed with other thermoplastic resin described hereinafter.

According to the present invention, a thermoplastic resin composition having good impact resistance and heat stability can be obtained by incorporating 2 to 50 parts by weight of an impact modifier for a thermoplastic resin, in which specific amounts of the above-mentioned specific heat stabilizers are incorporated, into 100 parts by weight of other thermoplastic resin.

The thermoplastic resin to be used in the present invention is not particularly critical, but preferably is at least one member selected from the group consisting of saturated polyester resins, polycarbonate resins, polyolefin resins, metacrylic resins and styrene resins. A saturated polyester resin or a mixture of a saturated polyester resin and a polycarbonate resin is especially preferred.

As the polyester resin to be used in the present invention, there can be mentioned polyethylene terephthalate and polytetramethylene terephthalate, and copolyesters formed by copolymerizing these polyesters with small amounts of a diol such as 1,3-propanediol and a dicarboxylic acid such as isophthalic acid can be used. These polyesters and copolyesters can be used alone or as a mixture of two or more thereof.

A polycarbonate derived from 2,2'-(4,4'-dihydroxydiphenyl)propane is mainly used as the polycarbonate resin, but of course, another bisphenol type polycarbonate can be used.

Polyethylene and polypropylene can be mentioned as the polyolefin resin.

As the methacrylic resin, there can be mentioned polymethyl methacrylate and a methyl methacrylate/alkyl acrylate copolymer formed by copolymerizing methyl methacrylate with a small amount of an alkyl acrylate.

As the styrene resin, there can be mentioned polystyrene, high-impact polystyrene (HIPS), an acrylonitrile/styrene copolymer and a styrene/maleic anhydride copolymer.

The impact modifier for a thermoplastic resin according to the present invention or a resin composition formed by incorporating this impact modifier into a thermoplastic resin may further comprise low-molecular-weight substances for preventing blocking, promoting crystallization, improving processability or improving weatherability, or fillers, reinforcers and colorants for improving the physical properties, so long as attainment of the object of the present invention is not hindered.

The present invention will now be described in detail with reference to the following examples and comparative examples. Note, all of "parts" and "%" in the examples are by weight.

The physical properties were determined by the following methods.

(1) Yellowness Index

The yellowness index (YI value) indicating the heat discoloration resistance is the value measured by a color computer (Model SM-4-2 supplied by Suga Shikenki) after a molded plate has been exposed at a predetermined temperature (180° C. or 200° C.) for 3 hours in a gear oven. The measurement is also conducted on the molded plate before the exposure.

(2) Izod Impact Strength

As the criterion indicating the heat deterioration resistance, the Izod impact strength (kg cm/cm²) is measured according to the standard of ASTM D-256 with respect to a molded article exposed at 180° C. or 200° C. in a gear oven for 3 hours. The measurement is also conducted on the molded plate before the exposure.

EXAMPLE 1

(1) Preparation of Latex of Butadiene Polymer (A-1)

A mixture of 100 parts of 1,3-butadiene, 4 parts of sodium laureate, 0.5 part of n-laurylmercaptan, 0.4 part of potassium persulfate and 180 parts of deionized water was charged in an autoclave, the inner atmosphere of which had been substituted with nitrogen, and polymerization was carried out at 60° C. with stirring for 50 hours to obtain a rubber latex (the average particle size was 0.09 μm).

| | |
|---|---|
| Ethyl acrylate | 90 parts |
| Methacrylic acid | 10 parts |
| Potassium persulfate | 0.5 part |
| Nonsal TK-1 (semi-hardened beef tallow potassium soap supplied by Nippon Oil and Fats) | 2.0 parts |
| Rapisol 80 (sodium octylsulfosuccinate supplied by Nippon Oil and Fats | 1.0 part |
| Water | 200 parts |

According to the above-mentioned recipe, polymerization was carried out at 70° C. for 4 hours to obtain an emulsion latex having a pH value of 6.2.

(3) Preparation of Agglomerated Latex

A reaction vessel equipped with a stirrer was charged with 100 parts (as solids) of the butadiene polymer (A-1) latex obtained in (1) above, and 1.0 part (as solids) of the latex (B) obtained in (2) above was added with stirring over a period of 10 seconds to obtain a agglomerated rubber latex.

(4) Preparation of Graft Copolymer

A reaction vessel was charged with 50 parts as solids of the agglomerated rubber latex obtained in (3) above and 0.15 part of Rongalit, and while the inner temperature was maintained at 70° C., a liquid mixture comprising 16 parts of methyl methacrylate, to which 0.08 part of cumene hydroperoxide (hereinafter referred to as "CHP") was added, and 4 parts of ethyl acrylate was continuously added dropwise over a period of 1 hour. The mixture was maintained in this state for 1 hour. Then, at the second step, 25 parts of styrene to which 0.1 part of CHP was added was continuously dropped into the mixture over a period of 1 hour and the mixture was maintained in this state for 2 hours. Then, at the third step, a liquid mixture comprising 4 parts of methyl methacrylate, 1 part of ethyl acrylate and 0.02 part of CHP was added dropwise to the reaction mixture over a period of 15 minutes and the mixture was maintained in this state for 1 hour to complete polymerization. The obtained latex was coagulated by a 0.2% aqueous solution of sulfuric acid, washed with warm water and dried to obtain a graft copolymer (G-1).

(5) Preparation of Impact Modifier (a)

Heat stabilizers shown in Table 1 were added in amounts shown in Table 1 and thoroughly mixed with 100 parts of the graft copolymer (G-1) obtained in (4) above by a mixer, and thus various impact modifiers (a) were obtained.

(6) Preparation of Polyester Resin Composition

Polybutylene terephthalate was mixed with the impact modifier (a) obtained in (5) above at a weight ratio of 80/20, and the mixture was melt-kneaded at 230° C. and pelletized by a vented extruder having a diameter of 25 mm. The obtained pellet was vacuum-dried and injection-molded at a resin temperature of 250° C. With respect to the obtained molded article, the yellowness index and Izod impact strength indicating the heat discoloration resistance and heat deterioration resistance were measured. The results are shown in Table 1.

The symbols shown in Table 1 and subsequent tables represent the following heat stabilizers.

S-1: tetrakis[methylene-3-(laurylthio)propionato]methane
S-2: bis[2-methyl-4-(3-n-dodecyl-thiopropio nyloxy)-5-tertiarybutylphenyl]sulfide
S-3: distearyl 3,3'-thiodipropionate
P-1: bis(2,4-di-tertiary-butylphenyl)pentaerythritol diphosphite
P-2: bis(2,6-di-tertiary-butyle-4-methylphenyl)-pentaerythritol diphosphite
H-1: n-octadecyl-3-(3',5'-di-tertiary-butyl-4'-hydroxypehnyl) propionate (molecular weight =530.9)
H-2: triethylene glycol bis[3-(3-tertiary-butyl-5-methyl-4-hydroxypehnyl)propionate](molecular weight =586. 8)
H-3: 2,6-di-tertiary-butyl-4-methylphenol (molecular weight =220)

TABLE 1

| | | Run No. | | | | | Comparative Run No. | | | | |
|---|---|---|---|---|---|---|---|---|---|---|---|
| | | 1 | 2 | 3 | 4 | 5 | 1 | 2 | 3 | 4 | 5 |
| Thioether type heat stabilizer (parts) | S-1 | 0.8 | — | — | 0.8 | 0.8 | 0.8 | 0.8 | 0.8 | — | — |
| | S-2 | — | 0.8 | — | — | — | — | — | — | — | — |
| | S-3 | — | — | 0.8 | — | — | — | — | — | — | — |
| Phosphite type heat stabilizer (parts) | P-1 | 1.0 | 1.0 | 1.0 | — | 1.0 | 1.0 | 1.0 | — | 1.0 | — |
| | P-2 | — | — | — | 1.0 | — | — | — | — | — | — |
| Phenol type heat stabilizer (parts) | H-1 | 0.5 | 0.5 | 0.5 | 0.5 | — | — | — | 0.5 | 0.5 | — |
| | H-2 | — | — | — | — | 0.5 | — | — | — | — | — |
| | H-3 | — | — | — | — | — | 0.5 | — | — | — | — |
| Heat discoloration resistance, yellowness index | *0 hour | 3 | 3 | 6 | 3 | 3 | 5 | 10 | 10 | 8 | 20 |
| | *3 hours | 6 | 8 | 12 | 5 | 7 | 25 | 83 | 61 | 98 | 125 |
| Heat deterioration resistance, Izod impact strength | *0 hour | 11 | 12 | 10 | 11 | 12 | 9 | 7 | 6 | 8 | 6 |
| | *3 hours | 8 | 8 | 7 | 9 | 8 | 5 | 3 | 4 | 3 | 2 |

*Note:
exposure time in a gear oven at 200° C.

EXAMPLE 2

(1) Preparation of Impact Modifier (b)

Heat stabilizers in amounts shown in Table 2 were thoroughly stirred and emulsified in an aqueous solution containing potassium oleate in an amount corresponding to the sum of the heat stabilizers, and the obtained emulsion was added to 100 parts (as solids) of the graft copolymer (G-1) latex obtained in (4) of Example 1. The mixture was coagulated with a 0.2% aqueous solution of sulfuric acid, washed with warm water and dried, and thus various impact modifiers (b) were obtained.

(2) Preparation of Polyester Resin Composition

Polybutylene terephthalate was mixed with the impact modifier obtained in (1) above at a weight ratio of 80/20. In the same manner as described in (6) of Example 1, the mixture was pelletized and injection-molded. The yellowness index and Izod impact strength of the obtained molded article were measured, and the results are shown in Table 2.

TABLE 2

| | | Run No. | | | Comparative Run No. | | | |
|---|---|---|---|---|---|---|---|---|
| | | 6 | 7 | 8 | 6 | 7 | 8 | 9 |
| Thioether type heat stabilizer (parts) | S-1 | 0.8 | — | 0.8 | 0.8 | 0.8 | — | — |
| | S-2 | — | 0.8 | — | — | — | — | — |
| Phosphite type heat stabilizer (parts) | P-1 | 1.0 | 1.0 | — | 1.0 | — | 1.0 | — |
| | P-2 | — | — | 1.0 | — | — | — | — |
| Phenol type heat stabilizer (parts) | H-1 | 0.5 | 0.5 | 0.5 | — | 0.5 | 0.5 | — |
| Heat discoloration | *0 hour | 3 | 4 | 3 | 13 | 10 | 5 | 16 |
| | *3 hours | 8 | 10 | 15 | 103 | 58 | 113 | 120 |
| Heat deterioration resistance, Izod impact strength | *0 hour | 11 | 12 | 10 | 8 | 8 | 9 | 6 |
| | *3 hours | 7 | 9 | 9 | 4 | 5 | 2 | 1 |

*Note:
exposure time in a gear oven at 200° C.

EXAMPLE 3

(1) Preparation of Polycarbonate/Polyester Resin Composition

Polycarbonate, polybutylene terephthalate and the impact modifier (a) obtained in (5) of Example 1 were mixed at a weight ratio of 30/60/10, and the mixture was melt-kneaded at 260° C. and pelletized by using a vented extruder having a diameter of 25 mm. In the same manner as described in (6) of Example 1, the pellet was injection-molded at a resin temperature of 260° C., and the yellowness index and Izod impact strength of the obtained molded article were measured. The results are shown in Table 3.

TABLE 3

| | | Run No. | | | | | Comparative Run No. | | | | |
|---|---|---|---|---|---|---|---|---|---|---|---|
| | | 9 | 10 | 11 | 12 | 13 | 10 | 11 | 12 | 13 | 14 |
| Thioether type heat stabilizer (parts) | S-1 | 0.8 | — | — | 0.8 | 0.8 | 0.8 | 0.8 | 0.8 | — | — |
| | S-2 | — | 0.8 | — | — | — | — | — | — | — | — |
| | S-3 | — | — | 0.8 | — | — | — | — | — | — | — |
| Phosphite type heat stabilizer (parts) | P-1 | 1.0 | 1.0 | 1.0 | — | 1.0 | 1.0 | 1.0 | — | 1.0 | — |
| | P-2 | — | — | — | 1.0 | — | — | — | — | — | — |
| Phenol type heat stabilizer (parts) | H-1 | 0.5 | 0.5 | 0.5 | 0.5 | — | — | — | 0.5 | 0.5 | — |
| | H-2 | — | — | — | — | 0.5 | — | — | — | — | — |
| | H-3 | — | — | — | — | — | 0.5 | — | — | — | — |
| Heat discoloration resistance, yellowness index | *0 hour | 2 | 5 | 6 | 3 | 2 | 15 | 26 | 30 | 21 | 35 |
| | *3 hours | 14 | 17 | 19 | 11 | 15 | 62 | 142 | 120 | 149 | 145 |
| Heat deterioration resistance, Izod impact strength | *0 hour | 83 | 80 | 85 | 85 | 80 | 78 | 65 | 72 | 75 | 60 |
| | *3 hours | 42 | 35 | 40 | 48 | 45 | 31 | 5 | 10 | 14 | 5 |

*Note:
exposure time in a gear oven at 200° C.

EXAMPLE 4

(1) Preparation of Polystyrene Resin Composition

A polystyrene resin was mixed with the impact modifier (a) obtained in (5) of Example 1 at a weight ratio of 65/35, and the mixture was melt-kneaded at 200° C. and pelletized by a vented extruder having a diameter of 25 mm. In the same manner as described in (6) of Example 1, the pellet was injection-molded at a resin temperature of 200° C. The yellowness index and Izod impact strength of the obtained molded article were measured, and the results are shown in Table 4.

TABLE 4

| | | Run No. | | | | | Comparative Run No. | | | | |
|---|---|---|---|---|---|---|---|---|---|---|---|
| | | 14 | 15 | 16 | 17 | 18 | 15 | 16 | 17 | 18 | 19 |
| Thioether type heat stabilizer (parts) | S-1 | 0.8 | — | — | 0.8 | 0.8 | 0.8 | 0.8 | 0.8 | — | — |
| | S-2 | — | 0.8 | — | — | — | — | — | — | — | — |
| | S-3 | — | — | 0.8 | — | — | — | — | — | — | — |
| Phosphite type heat stabilizer (parts) | P-1 | 1.0 | 1.0 | 1.0 | — | 1.0 | 1.0 | 1.0 | — | 1.0 | — |
| | P-2 | — | — | — | 1.0 | — | — | — | — | — | — |
| Phenol type heat stabilizer (parts) | H-1 | 0.5 | 0.5 | 0.5 | 0.5 | — | — | — | 0.5 | 0.5 | — |
| | H-2 | — | — | — | — | 0.5 | — | — | — | — | — |
| | H-3 | — | — | — | — | — | 0.5 | — | — | — | — |
| Heat discoloration resistance, yellowness index | *0 hour | 2 | 3 | 2 | 4 | 2 | 6 | 5 | 10 | 6 | 16 |
| | *3 hours | 10 | 11 | 8 | 12 | 8 | 38 | 80 | 55 | 85 | 101 |
| Heat deterioration resistance, Izod impact strength | *0 hour | 6 | 6 | 5 | 5 | 6 | 5 | 5 | 4 | 5 | 4 |
| | *3 hours | 5 | 6 | 5 | 5 | 5 | 4 | 2 | 3 | 2 | 1 |

*Note:
exposure time in a gear oven at 180° C.

EXAMPLE 5

| | |
|---|---|
| Copolymer (A-2) | |
| 1,3-Butadiene | 75 parts |
| Styrene | 25 parts |
| Divinylbenzene | 1 part |
| Di-isopropylbenzene hydroperoxide | 0.2 part |
| Sodium pyrophosphate | 0.5 part |
| Ferrous sulfate | 0.01 part |
| Dextrose | 1.0 part |
| Potassium oleate | 2.0 parts |
| Water | 200 parts |

According to the above-mentioned recipe, polymerization was carried out at 50° C. in a pressureresistant autoclave. The polymerization was completed in 8 hours and the average particle size of the obtained rubber was 0.08 μm.

(2) Preparation of Graft Copolymer

In the same manner as described in (2) through (4) of Example 1, a graft copolymer (G-2) was prepared by using the butadiene/styrene copolymer (A-2) latex obtained in (1) above.

(3) Preparation of Polyester Resin Composition

Polybutylene terephthalate was mixed with the graft copolymer (G-2) obtained in (2) above at a weight ratio of 80/20, and then heat stabilizers were added to the mixture in predetermined amounts, shown in Table 5, per 100 parts of the graft copolymer (G-2), and the resulting composition was thoroughly mixed by a mixer. Pelletization and injection molding were carried out in the same manner as described in (6) of Example 1. The yellowness index and Izod impact strength were measured, and the results are shown in Table 5.

TABLE 5

|  |  | Run No. | | | Comparative Run No. | | | | |
| --- | --- | --- | --- | --- | --- | --- | --- | --- | --- |
|  |  | 19 | 20 | 21 | 20 | 21 | 22 | 23 | 24 |
| Thioether type heat stabilizer (parts) | S-1 | 0.8 | — | 0.8 | 0.8 | 0.8 | 0.8 | — | — |
|  | S-2 | — | 0.8 | — | — | — | — | — | — |
| Phosphite type heat stabilizer (parts) | P-1 | 1.0 | 1.0 | — | 1.0 | 1.0 | — | 1.0 | — |
|  | P-2 | — | — | 1.0 | — | — | — | — | — |
| Phenol type heat stabilizer (parts) | H-1 | 0.5 | 0.5 | 0.5 | — | — | 0.5 | 0.5 | — |
|  | H-3 | — | — | — | 0.5 | — | — | — | — |
| Heat discoloration resistance, yellowness index | *0 hour | 2 | 4 | 3 | 5 | 10 | 11 | 4 | 16 |
|  | *3 hours | 6 | 8 | 12 | 38 | 83 | 62 | 101 | 124 |
| Heat deterioration resistance, Izod impact strength | *0 hour | 8 | 10 | 10 | 9 | 7 | 8 | 6 | 6 |
|  | *3 hours | 6 | 6 | 7 | 3 | 4 | 4 | 1 | 1 |

*Note:
exposure time in a gear oven at 200° C.

EXAMPLE 6

(1) Preparation of Polycarbonate/Polybutylene Terephthalate Resin Composition

Polycarbonate, polybutylene terephthalate and the graft copolymer (G-2) obtained in Example 5 were mixed at a weight ratio of 30/60/10, and heat stabilizers were added to the mixture in predetermined amounts, shown in Table 6, per 100 parts of the graft copolymer (G-2) and the composition was sufficiently mixed by a mixer. Pelletization and injection molding were carried out in the same manner as described in Example 3. The yellowness index and Izod impact strength of the obtained molded article were measured, and the results are shown in Table 6.

We claim:

TABLE 6

|  |  | Run No. | | | Comparative Run No. | | | | |
| --- | --- | --- | --- | --- | --- | --- | --- | --- | --- |
|  |  | 22 | 23 | 24 | 25 | 26 | 27 | 28 | 29 |
| Thioether type heat stabilizer (parts) | S-1 | 0.8 | — | 0.8 | 0.8 | 0.8 | 0.8 | — | — |
|  | S-2 | — | 0.8 | — | — | — | — | — | — |
| Phosphite type heat stabilizer (parts) | P-1 | 1.0 | 1.0 | — | 1.0 | 1.0 | — | 1.0 | — |
|  | P-2 | — | — | 1.0 | — | — | — | — | — |
| Phenol type heat stabilizer | H-1 | 0.5 | 0.5 | 0.5 | — | — | 0.5 | 0.5 | — |
|  | H-3 | — | — | — | 0.5 | — | — | — | — |

TABLE 6-continued

|  |  | Run No. | | | Comparative Run No. | | | | |
| --- | --- | --- | --- | --- | --- | --- | --- | --- | --- |
|  |  | 22 | 23 | 24 | 25 | 26 | 27 | 28 | 29 |
| (parts) |  |  |  |  |  |  |  |  |  |
| Heat discoloration resistance, yellowness index | *0 hour | 1 | 2 | 1 | 4 | 10 | 8 | 8 | 13 |
|  | *3 hours | 6 | 6 | 10 | 30 | 62 | 68 | 95 | 112 |
| Heat deterioration resistance, Izod impact strength | *0 hour | 78 | 74 | 77 | 65 | 64 | 66 | 62 | 58 |
|  | *3 hours | 40 | 39 | 40 | 20 | 19 | 19 | 15 | 11 |

*Note:
exposure time in a gear oven at 200° C.

1. An impact modifier for a thermoplastic resin having an excellent heat discoloration resistance and heat deterioration resistance, which comprises:

(I) 100 parts by weight of a graft copolymer formed by graft-polymerizing (B) a monomer having a vinyl group in the molecule onto (A) a butadiene polymer and, incorporated therein, (II) 0.01 to 5 parts by weight of a thioether type heat stabilizer selected from the group consisting of 3,3'-thiodipropionic acid, dialkyl 3,3'-thiodipropionates, pentaerythrityl-tetrakis (3-alkylthiopropionates), tetrakis methanes and bis-sulfides, (III) 0.01 to 5 parts by weight of a phosphite type heat stabilizer selected from the group consisting of tris(nonylphenyl) phosphite, distearylpentaerythritol diphosphite, tris (2,4-di-tertiary-butylphenyl) phosphite, di(2,4-di-tertiarybutylphenyl) pentaerythritol diphosphite and bis(2,6-di-tertiary-butyl-4-methylphenyl)pentaerythritol diphosphite, and (IV) 0.01 to 5 parts by weight of a phenol type heat stabilizer having a molecular weight of at least 500 which is selected from the group consisting of 1,1,3-tris(2-methyl-4-hydroxy-5-tertiary-butylphenyl)butane, n-octadecyl-3-(3',5'-di-tertiary-butyl-4'-hydroxyphenyl) propionate, tertrakis methane, triethylene glycol bis and pentaerythrityl tetrakis.

2. A thermoplastic resin composition having good impact resistance and heat stability, which comprises 100 parts by weight of a thermoplastic resin and 2 to b 50 parts by weight of an impact modifier for a thermoplastic resin, said impact modifier comprising:

(I) 100 parts by weight of a graft copolymer formed by graft polymerizing (B) a monomer having a vinyl group in the molecule onto (A) a butadiene polymer and, incorporated therein, (II) 0.01 to 5 parts by weight of a thioether type heat stabilizer selected from the group consisting of 3,3'-thiodipropionic acid, dialkyl 3,3'-thiodipropionates, pentaerythrityl-tetrakis-(3-alkylthiopropionates), tetrakis methanes and bis-sulfides, (III) 0.01 to 5 parts by weight of a phosphite type heat stabilizer selected from the group consisting of tris(nonylphenyl) phosphite, distearylpentaerythritol diphosphte, tris(2,4-di-tertiary-butylphenyl) phosphite, di(2,4-di-tertiary-butylphenyl)pentaerythritol diphosphite and bis(2,6-di-tertiary-butyl-4-methylphenyl)pentaerythritol diphosphite, and (IV) 0.01 to 5 parts by weight of a phenol type heat stabilizer having a moleculear weight of at least 500 which is selected from the group consisting of 1,1,3-tris(2-methyl-4-hydroxy-5-tertiary-butylphenyl)butane, n-octadecyl-3-(3',5'-di-tertiary-butyl-4'-hydroxyphenyl)-propionate, tetrakis methane, triethylene glycol bis and pentaerythrityl tetrakis.

3. An impact modifier for a thermoplastic resin according to claim 1, wherein the butadiene polymer (A) is a butadiene homopolymer, a butadiene/styrene copolymer or a butadiene/alkyl acrylate copolymer.

4. An impact modifier for a thermoplastic resin according to claim 1, wherein the monomer (B) having a vinyl group in the molecule is at least one member selected from the group consisting of alkyl methacrylates, alkyl acrylates, aromatic vinyl compounds and vinyl cyanide compounds.

5. An impact modifier for a thermoplastic resin according to claim 1, wherein the thioether type heat stabilizer (II) is selected from the group consisting of dialkyl 3,3'-thiodipropionates, tetrakis methanes and bis sulfides.

6. An impact modifier for a thermoplastic resin according to claim 1, wherein the phosphite heat stabilizer (III) is selected from the group consisting of di(2,4-di-tertiarybutylphenyl)pentaerythritol diphosphite and bis(2,6-di-tertiary-butyl-4-methylphenyl)pentaerythritol diphosphite.

7. An impact modifier for a thermoplastic resin according to claim 1, wherein the phenol type heat stabilizer (IV) is selected from the group consisting of n-octadecyl-3-(3',5'-di-tertiary-butyl-4'-hydroxyphenyl) propionate and triethylene glycol-bis.

8. A thermoplastic resin composition according to claim 2, wherein the thermoplastic resin is at least one member selected from the group consisting of saturated polyester resins, polycarbonate resins, polyolefin resins, methacrylic resins and styrene resins.

9. A thermoplastic resin composition according to claim 2, wherein the butadiene polymer (A) is a butadrene homopolymer, a butadiene/styrene copolymer or a butadiene/alkyl acrylate copolymer.

10. A thermoplastic resin composition according to claim 2 wherein the monomer (B) having a vinyl group in the molecule is at least one member selected from the group consisting of alkyl methacrylates, alkyl acrylates, aromatic vinyl compounds and vinyl cyanide compounds.

11. A thermoplastic resin composition according to claim 2 wherein the thioether type heat stabilizer (II) is selected from the group consisting of dialkyl 3,3'-thiodipropionates, tetrakis methanes and bis sulfides.

12. A thermoplastic resin composition according to claim 2 wherein the phosphite type heat stabilizer (III) rs selected from the group consisting of di(2,4-di-tertiary-butylphenyl)pentaerythritol diphosphite and bis(2,6-di-tertiary-butyl-4-methylphenyl)pentaerythritol diphosphite.

13. A thermoplastic resin composition according to claim 2 wherein the phenol type heat stabilizer (IV) is selected from the group consisting of n-octa-decyl-3-(3',5'-di-tertiary-butyl-4'-hydroxyphenyl)-propionate and triethylene glycol-bis.

* * * * *